Patented Nov. 3, 1925.

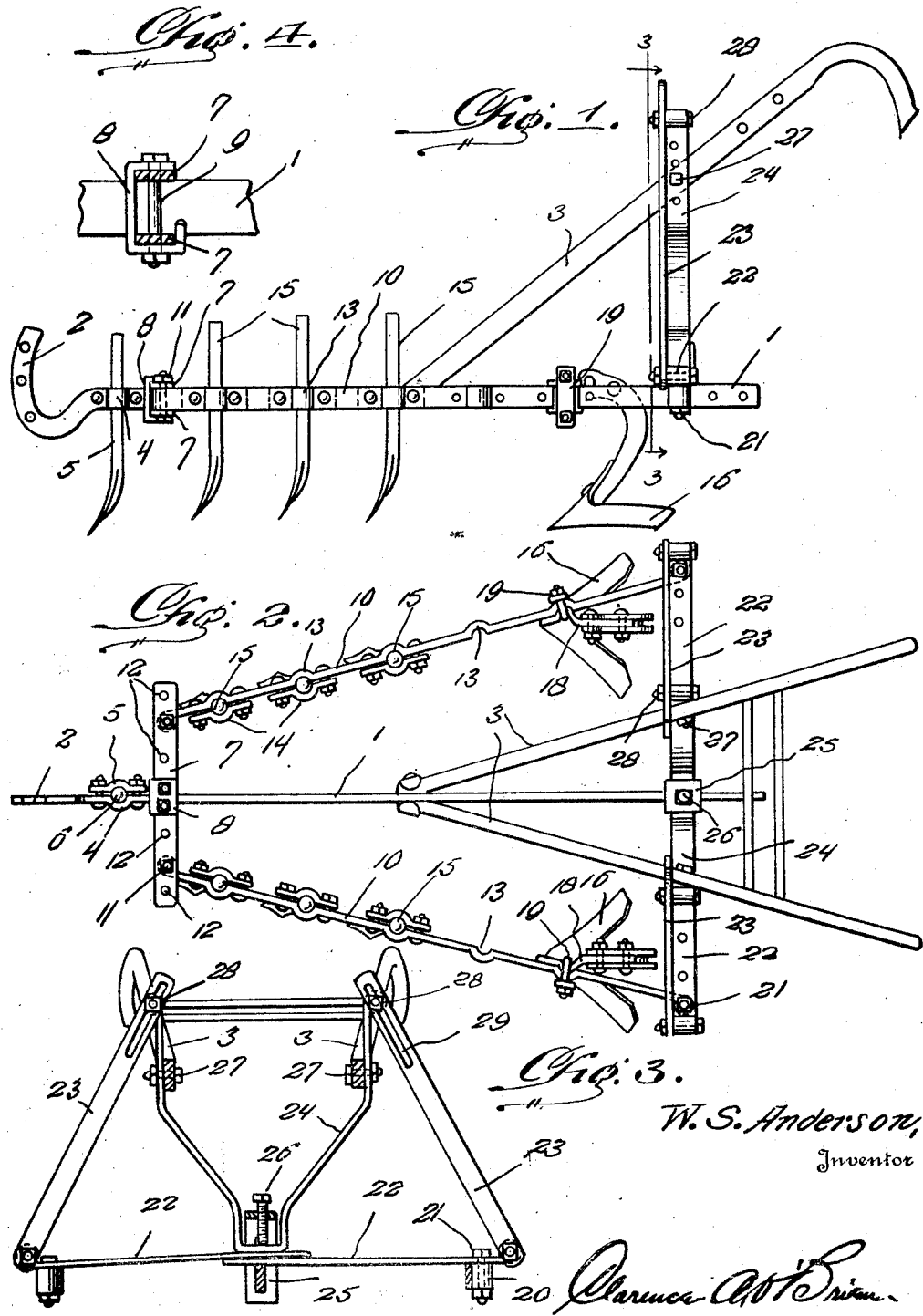

1,560,362

UNITED STATES PATENT OFFICE.

WALTER S. ANDERSON, OF COBBVILLE, GEORGIA.

CULTIVATING IMPLEMENT.

Application filed April 18, 1924. Serial No. 707,457.

*To all whom it may concern:*

Be it known that I, WALTER S. ANDERSON, a citizen of the United States, residing at Cobbville, in the county of Telfair and State of Georgia, have invented certain new and useful Improvements in Cultivating Implements, of which the following is a specification.

This invention relates to improvements in cultivating implements.

An object of the invention resides in providing a frame structure having handle bars at the rear end thereof and provided with a draw bar at the forward end thereof, having adjustable implement carrying members or bars adapted to be changed in their angular relation with respect to each other and the frame, for changing the scope of cultivation thereby, for adapting the implement to cultivate between plant rows of different spacing, in order that the entire space between the plant rows may be thoroughly cultivated.

Another object of the invention resides in providing a cultivating implement, wherein the frame portion carries adjustable implement bars, which are adapted to receive harrowing implements and sweeps adjustably mounted on said bars, so that the implement carrying bars may be adjusted for changing the width of the path cultivated by the implement, in order that it may be adapted to entirely cultivate the earth between plant rows and the sweeps being adjustable on said bars for setting, so that dirt may be thrown toward the plant or pulled away from said plant.

Another object of the invention resides in providing an exceedingly simple and efficient cultivator structure wherein the main frame includes a longitudinally extending bar provided in the forward end with a draw bar portion, and which mounts handle bars at the rear end thereof together with a U-shaped bracket for supporting said handle bars in angular relation to the longitudinal bar, a cross bar being mounted in the rear of the draw bar portion on said longitudinal bar, which pivotally and adjustably mounts implement carrying bars at each side of said longitudinal bar, and which carries harrowing and cultivating implements, link connections being provided at the rear ends of said implement carrying bars, for adjustable connection with the longitudinally extending bar, and the upper ends of said U-shaped bracket member respectively, for holding said implement bars in a predetermined adjusted relation.

The invention comprehends other objects and improvements in the details of construction and arrangement of the parts, which are more particularly pointed out in the following description and claim, which are directed to a preferred form of the invention, it being understood, however, that various changes in the construction and assemblage of the several parts, may be made within the scope of the invention as described and claimed.

In the drawing, forming part of this application:

Figure 1 is a side elevation of the improved cultivating implement forming the subject of this invention.

Figure 2 is a plan view thereof.

Figure 3 is a vertical sectional view, taken on the line 3—3 of Figure 1.

Figure 4 is a detail view, of the means for securing the cross members to the main frame bar.

This new cutivating implement includes a main longitudinal frame bar 1, formed at the forward end with a hooked portion 2, provided with a plurality of openings, adapted to receive a clevis or other suitable connection for attaching the cultivating implement to a suitable source of traction, while a pair of angularly arranged handle bars 3, are secured in the central portion of the bar 1, and extend upwardly and rearwardly therefrom. The bar 1 is formed immediately in the rear of the hook portion 2, with a semi-circular portion 4, with which cooperates a clamp 5, for securing a harrow tooth 6 thereto. A pair of cross members 7 are secured above and below the main frame bar 1, by a bracket member 8, substantially of U-shape, having the central portion thereof slotted to receive the bar 1, while the legs thereof are provided with openings for receiving securing bolts 9, adapted to extend through openings in the cross members 7, so that the legs of said bracket member may be drawn together for engaging the cross members and forcing them toward the bar 1, so that they will be held in rigid engagement therewith.

A pair of implement carrying bars 10 are pivotally and adjustably secured at the forward end at opposite sides of the bar 1, between the cross members 7, by a suitable bolt 11, adapted to be extended through aligned openings 12 formed in said cross members. The implement carrying bars 10 are formed with a plurality of semi-circular portions 13 arranged in spaced relation, and with which cooperate clamps 14 for securing cultivating implements thereto, as indicated at 15. The elements 15 are in the form of harrow teeth similar to the tooth 6, carried by the bar 1. At the rear end of these implement carrying bars, sweeps 16 have their shank portions 17 secured to pivot bars 18, having semi-circular portions fitting the semi-circular portions of the implement carrying bar, and secured thereto by U-bolt clamp members 19 so that said sweeps may be adjusted by pivotal movement of the bars 18, relative to said implement carrying bars.

At the rear ends, the implement carrying bars 10 are formed with eyes 20, receiving bolts 21 for securing adjusting links 22 thereto, the outer end of which pivotally mounts angularly arranged connecting links 23, which extend upwardly over the handle 3. A U-shaped bracket member 24 is positioned over the bar 1, and the inner ends of the adjusting links 22, which are arranged in overlapped relation to each other, and extend across the top portion of the main frame bar. An L-shaped bracket member 25, formed with a slot extending longitudinally of the longer leg thereof, receives the bar 1, while the other portion of the member receives the set screw 26, adapted to engage the central portion of the bracket member 24, for forcing said bracket member in the overlapped ends of the adjusting rings in rigid connecting relation with respect to the frame bar 1. The handle bars 3 are bolted to the upper end portions of the bracket member 24, as indicated at 27, while the upper ends of said U-shaped bracket member receive bolts 28, which are fastened through slots 29 in the connecting links 23, for locking said links in connection therewith.

The connecting links 23 and the adjusting links 22, being connected in angular relation to the bracket member 24 and the frame bar 1, in the manner clearly illustrated in Figure 3, serves to hold the rear end of said instrument carrying bars in rigid and fixed relation, in any set position, with respect to the main frame bar 1 and the handle portion 3, so that a rigid frame construction is provided for the cultivating implements. This construction also provides for the ready adjustment of the implement carrying bars in order to position the cultivating implements to cultivate either a wider or narrower path by merely loosening the bolts 28 and the set screws 26, following which the implement carrying bars may be swung on their pivotal connection 11 with the cross member 7, so that the implement may be adjusted for cultivating predetermined spaced rows of plants.

It is to be further observed that additional adjustment of the cultivating elements is provided for, through the adjustable connection of the forward end of the implement carrying bars with the cross member 7, which may be effected by changing the position of the bolts 11, to one of the other sets of aligned openings 12, in said cross members. By adjusting the bar members 18, with respect to the implement carrying members 10, the sweep 16 may be adjusted to change the angular relation of their blades, in order that dirt may be thrown toward the row of plants or pulled away from the plants, as desired, the adjustment of these sweeps being such as to permit placing the blades substantially at right angles to the line of the plant row, or in any other desired angular relation, with respect thereto, in order to effect a desired cultivating operation on the plant.

As the implement above described includes harrow teeth, as well as cultivator sweeps, it will be seen that a combined harrowing and cultivating action will take in one operation of the sweep, and which will effectively cultivate all of the ground between the plant rows by the proper adjustment of the implement carrying bars 10, so that while the dirt adjacent the plant rows is properly loosened by the sweep, and thrown toward or away from the plant, the harrow elements will dig up the intervening earth and destroy weeds.

It will be readily apparent, therefore, from the above description, that a simple and efficient cultivating implement has been provided, which will carry out a plurality of cultivating operations at one time, and the parts of which are readily adjustable for accommodating the use of the implement to various purposes.

What is claimed is:

In a cultivator, a side bar having a transversely disposed semi-circular recess formed therein, a standard having a laterally disposed semi-circular hump formed therein and adapted to enter the recess of the bar, said hump being located at the line between the ends of the standards, a clamp bolt having its intermediate portion disposed transversely of the standard and the bar at the hump and recess thereof, the end portions of the bolt being disposed transversely across the edges of the standard and the bar, a clamp plate applied to the bolt and a soil engaging element carried by the standard.

In testimony whereof I affix my signature.

W. S. ANDERSON.